US012621129B2

(12) United States Patent
Montero et al.

(10) Patent No.: US 12,621,129 B2
(45) Date of Patent: May 5, 2026

(54) SYSTEMS AND METHODS FOR MANAGING STORAGE DEVICES FOR DATA PROCESSING SYSTEMS USING OUT-OF-BAND METHODS

(71) Applicant: Dell Products L.P., Round Rock, TX (US)

(72) Inventors: Adolfo Sandor Montero, Pflugerville, TX (US); Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, McKinney, TX (US); Luis Antonio Valencia Reyes, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/649,173

(22) Filed: Apr. 29, 2024

(65) Prior Publication Data

US 2025/0337563 A1     Oct. 30, 2025

(51) Int. Cl.
H04L 9/08          (2006.01)
(52) U.S. Cl.
CPC ............ H04L 9/0825 (2013.01); H04L 9/083 (2013.01); H04L 9/0872 (2013.01)

(58) Field of Classification Search
CPC ...... H04L 9/0825; H04L 9/083; H04L 9/0872
See application file for complete search history.

(56) References Cited

U.S. PATENT DOCUMENTS

| | | | |
|---|---|---|---|
| 8,042,182 B2 | 10/2011 | Milani Comparetti et al. | |
| 8,615,785 B2 | 12/2013 | Elrod | |
| 8,627,467 B2 | 1/2014 | Levy | |
| 8,924,620 B2 | 12/2014 | Harriman et al. | |
| 9,215,244 B2 | 12/2015 | Ayyagari et al. | |
| 9,734,169 B2 | 8/2017 | Redlich et al. | |
| 10,079,880 B2 | 9/2018 | Murphy | |
| 10,176,308 B2 | 1/2019 | Mintz et al. | |
| 10,298,670 B2 | 5/2019 | Ben-Shael et al. | |
| 10,642,998 B2 | 5/2020 | Ford | |
| 10,671,765 B2 | 6/2020 | Swierk et al. | |
| 11,036,902 B2 | 6/2021 | Nicholas | |
| 11,050,570 B1 * | 6/2021 | Totah ................... | H04L 9/3215 |
| 11,102,122 B2 | 8/2021 | Seed et al. | |

(Continued)

*Primary Examiner* — Viet D Vu
(74) *Attorney, Agent, or Firm* — WOMBLE BOND DICKINSON (US) LLP

(57) ABSTRACT

Methods and systems for managing operation of data processing system are disclosed. To manage operation of the data processing system, a management controller of the data processing system may obtain and manage requests to perform management operation of data stored in a storage device hosted by the data processing system. The management controller may select a functionality of the storage device based at least on the request to invoke the functionality to obtain updated data stored in the storage device. By doing so, the likelihood of providing management operation services to manage data stored in a storage device of the data processing system may be increased without utilizing in-band components.

20 Claims, 7 Drawing Sheets

(56) References Cited

U.S. PATENT DOCUMENTS

| | | | |
|---|---|---|---|
| 11,134,380 B2 | 9/2021 | Fox et al. | |
| 11,250,158 B2 | 2/2022 | Ford | |
| 11,487,274 B2 | 11/2022 | Valder et al. | |
| 11,792,267 B2 | 10/2023 | Kreiner et al. | |
| 12,068,958 B1 * | 8/2024 | Henkel | H04L 41/122 |
| 2004/0049699 A1 | 3/2004 | Griffith | |
| 2007/0180528 A1 * | 8/2007 | Kane | H04L 1/0075 |
| | | | 726/24 |
| 2009/0106836 A1 | 4/2009 | Toshima | |
| 2011/0087387 A1 | 4/2011 | Safa-Bakhsh et al. | |
| 2011/0173326 A1 * | 7/2011 | Lambert | G06F 9/5061 |
| | | | 709/226 |
| 2011/0209216 A1 | 8/2011 | Zohar | |
| 2013/0290708 A1 * | 10/2013 | Diaz | H04L 63/08 |
| | | | 713/165 |
| 2013/0324081 A1 | 12/2013 | Gargi | |
| 2016/0036839 A1 | 2/2016 | Shimizu | |
| 2016/0100315 A1 | 4/2016 | Schenkel | |
| 2016/0197946 A1 | 7/2016 | Szekely | |
| 2018/0039946 A1 | 2/2018 | Bolte et al. | |
| 2018/0124078 A1 | 5/2018 | Hajmasan | |
| 2018/0260342 A1 * | 9/2018 | Thangaraj | G06F 11/3452 |
| 2019/0188368 A1 | 6/2019 | Hastings | |
| 2020/0112555 A1 | 4/2020 | Brown | |
| 2020/0244691 A1 | 7/2020 | Veeramany | |
| 2021/0034048 A1 | 2/2021 | Hajizadeh | |
| 2021/0073211 A1 | 3/2021 | Wright, Sr. | |
| 2022/0038659 A1 | 2/2022 | Michel | |
| 2022/0121511 A1 * | 4/2022 | Fredette | G06F 11/0721 |
| 2023/0119649 A1 | 4/2023 | Scherer | |
| 2024/0406145 A1 | 12/2024 | Crabtree | |
| 2025/0165616 A1 | 5/2025 | Cameron | |
| 2025/0193019 A1 | 6/2025 | Koulouris | |

* cited by examiner

SYSTEMS AND METHODS FOR MANAGING STORAGE DEVICES FOR DATA PROCESSING SYSTEMS USING OUT-OF-BAND METHODS

FIELD

Embodiments disclosed herein relate generally to managing a data processing system. More particularly, embodiments disclosed herein relate to systems and methods for managing operation of data processing systems including sound systems using a management controller of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
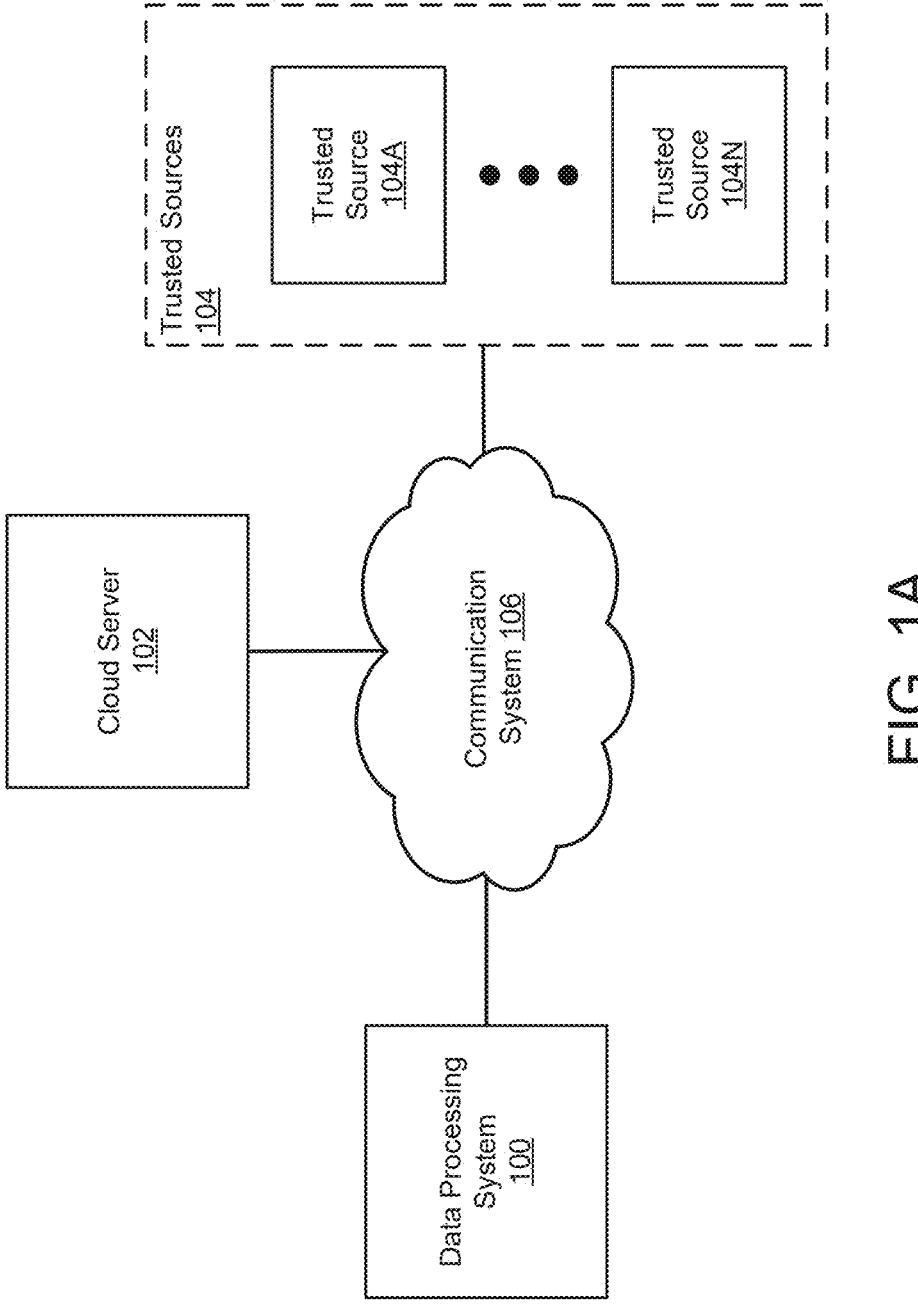
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operations of a data processing system. The data processing system may provide computer-implemented services to any type and number of other devices and/or users of the data processing system. The computer-implemented services may include any quantity and type of such services. For example, the data processing system may provide data management services such as collection, storage, removal, and/or otherwise management of data on behalf of an individual (e.g., user or administrator of the data processing system).

The data processing system may include in-band components (e.g., hardware components and/or software resources) that may facilitate and/or perform the desired computer-implemented services. For example, an operating system of the data processing system may manage requests regarding data stored in a storage device (e.g., solid-state drive "SSD") hosted by the data processing system. Managing requests regarding data stored by the hardware resources of the data processing system may include an interaction between hardware components of the data processing system and a cloud server.

For example, an administrator or user of the data processing system may request modification (e.g., deletion, encryption, etc.) to the data stored by the data processing system and the cloud server may provide instructions (e.g., for managing the data) to the data processing system using in-band components connected to a network shared with the cloud server.

However, providing the instructions via in-band components of the data processing system may not provide an adaptable solution in the event the hardware resources (e.g., including the in-band components) of the data processing system are not functional and/or operational. For example, the hardware resources of the data processing system may become unpowered for periods of time, may be unable to connect to a communication network, and/or may become compromised by a malicious party (e.g., that may perform unauthorized modifications to the data stored by the data processing system).

Consequently, compromise and/or otherwise reduced functionality of the in-band components of the data processing system may lead to a reduction in the quality and/or availability of the computer-implemented services to the user of the data processing system.

To manage operation of the data processing system in the event of compromise and/or reduced functionality of one or more in-band components of the data processing system, the data processing system may utilize out-of-band components (and/or out-of-band communication channels) to obtain and/or facilitate performance of management operations for data stored in a storage device hosted by the data processing system. The out-of-band components may function independently from the in-band components of the data processing system. Consequently, if in-band components and/or in-band communication channels are compromised or non-operational, then the management operation services provided using the out-of-band methods may remain available and reliable.

By doing so, embodiments disclosed herein may provide a system for managing (operation of) a data processing system based on requests to perform management operations for data stored by a storage device of the hardware resources hosted by the data processing system. To do so, the data processing system may include out-of-band components such as a management controller to manage operation and initiate performance of management operations for data (e.g., as specified by the requests) in order to provide the desired computer-implemented services even during limited functionality or operation of in-band components of the data processing system. Thus, the computer-implemented services may be more likely to be provided as desired to a downstream consumer or user of the data processing system.

In an embodiment, a method for managing operation of a data processing system is provided. The method may include: obtaining, by a management controller of the data processing system and via an out-of-band channel, a request, the request specifying sound information for the data processing system; performing a verification process using the request to determine whether the request is from a trusted source; in an instance of performing the verification process where the request is determined to be from the trusted source: processing, by the management controller, a payload of the request to identify an action set to be performed; identifying, by the management controller, a sound system hosted by hardware resources of the data processing system to perform the action set; and providing, by the management controller and using a direct interface to the sound system, instructions to perform the action set in order to provide computer-implemented services by generating an auditory signal.

A method for managing operation of a data processing system, the method comprising: obtaining, by a management controller of the data processing system and via an out-of-band communication channel, a request to perform a management operation for data stored in a storage device of hardware resources of the data processing system using sideband access to the storage device that bypass in band controls over the data; selecting, by the management controller and based at least in part on the request, at least one functionality of the storage device; and invoking, by the management controller and via a sideband channel, the at least one functionality of the storage device to obtain updated data stored in the storage device.

Obtaining the request may include: receiving communications from a cloud server in which the request is conveyed to the management controller.

The request may be initiated by a trusted source distinct from the cloud server.

The management operation may be one operation selected from a list of operations consisting of: deletion of the data; encryption of the data; verification of integrity and/or trust in the data; and decryption of the data.

The encryption of the data may use an encryption key specified by the cloud server.

The encryption of the data may be based on a policy that keys encryption states of the data to a current geographic location of the endpoint device.

The sideband access may be facilitated using a shared communication bus between the management controller and the storage device.

The storage device may be a solid state storage device.

The solid state storage device may be compliant with a mechanical form factor associated with a Non-Volatile Memory Express (NVMe) protocol.

Invoking the at least one functionality may include: obtaining, by the management controller, an encryption key from a payload of the request; and using the encryption key to encrypt the data stored in the storage device.

The encryption key may be generated by the cloud server and permanently deleted from the data processing system after the data is encrypted.

Invoking the at least one functionality may include: initiating generation of a second hash for the data and comparison of the second hash to a signature of a known good copy of the data, The signature comprises a hash of the known good copy of the data.

The network module may be adapted to separately advertise network endpoints for the management controller and hardware resources of the data processing system, the network endpoints being usable by a server to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

Operation of and/or computer-implemented services provided by a data processing system (e.g., data processing system 100) may be negatively impacted if in-band components (e.g., hardware components and/or software resources) have limited functionality and/or are not operational. For example, a user of data processing system 100 may be unable to physically locate the data processing system 100 and as such, the user may provide a request to generate an auditory signal to be performed by in-band components of the data processing system in order to locate the data processing system. However, the user may be unable to locate the data processing system using auditory signals if, for example, the operating system and/or the sound system is not operational (e.g., powered off) and unable to generate the auditory signals.

In general, embodiments disclosed herein may provide methods, systems, and/or devices for managing operation of a data processing system. The data processing system may include out-of-band components that may be utilized to manage storage devices without traversing in-band communication channels. For example, the out-of-band components may manage requests for managing data stored in a storage device of the hardware resources of the data processing system using sideband access to the storage device that bypasses in-band communication to control the data. By doing so, potentially limited functionality and/or inoperable in-band components may be circumvented, increasing the likelihood of performing the management operation for the data stored in the storage device of the data processing system in order to provide the desired computer-implemented services.

To perform the above-mentioned functionality, the system of FIG. 1A may include data processing system 100, cloud server 102, and/or trusted sources 104. Data processing system 100, cloud server 102, trusted sources 104, and/or any other type of devices not shown in FIG. 1A may perform all, or a portion of the computer-implemented services independently and/or cooperatively. Each of these components is discussed below.

Data processing system 100 may include any number and/or type of data processing systems and may provide computer-implemented services such as data storage services. To do so, data processing system 100 may include out-of-band components (e.g., a network module, a management controller, etc.), and functionality that may allow data exchange between the out-of-band components independently from in-band components of data processing system 100. For more information regarding out-of-band components of data processing system 100, refer to the discussion of FIG. 1B.

For example, the out-of-band components of data processing system 100 may (i) obtain requests to perform a management operation for data stored in a storage device of the hardware resources of the data processing system, (ii) select, based at least in part on the request, at least one functionality of the storage device, (iii) invoke, using a sideband communication channel, the at least one functionality of the storage device to obtain updated data stored in the storage device, and/or (iv) perform other actions relating to facilitating data management for the data processing system in order to provide the desired computer-implemented services.

Cloud server 102 may include any number and/or type of servers (e.g., other data processing systems, management systems, storage devices, user devices, etc.) that may provide computer-implemented services, such as data management services. To perform its functionality, cloud server 102 may communicate (e.g., exchange data) with the out-of-band components of data processing system 100 using out-of-band communication channels. For example, cloud server 102 may provide data management services for data processing system 100 by facilitating transmission of requests to manage data stored by data processing system 100 via a management controller of data processing system 100 (e.g., bypassing any in-band components of data processing system 100).

Figure 2A:
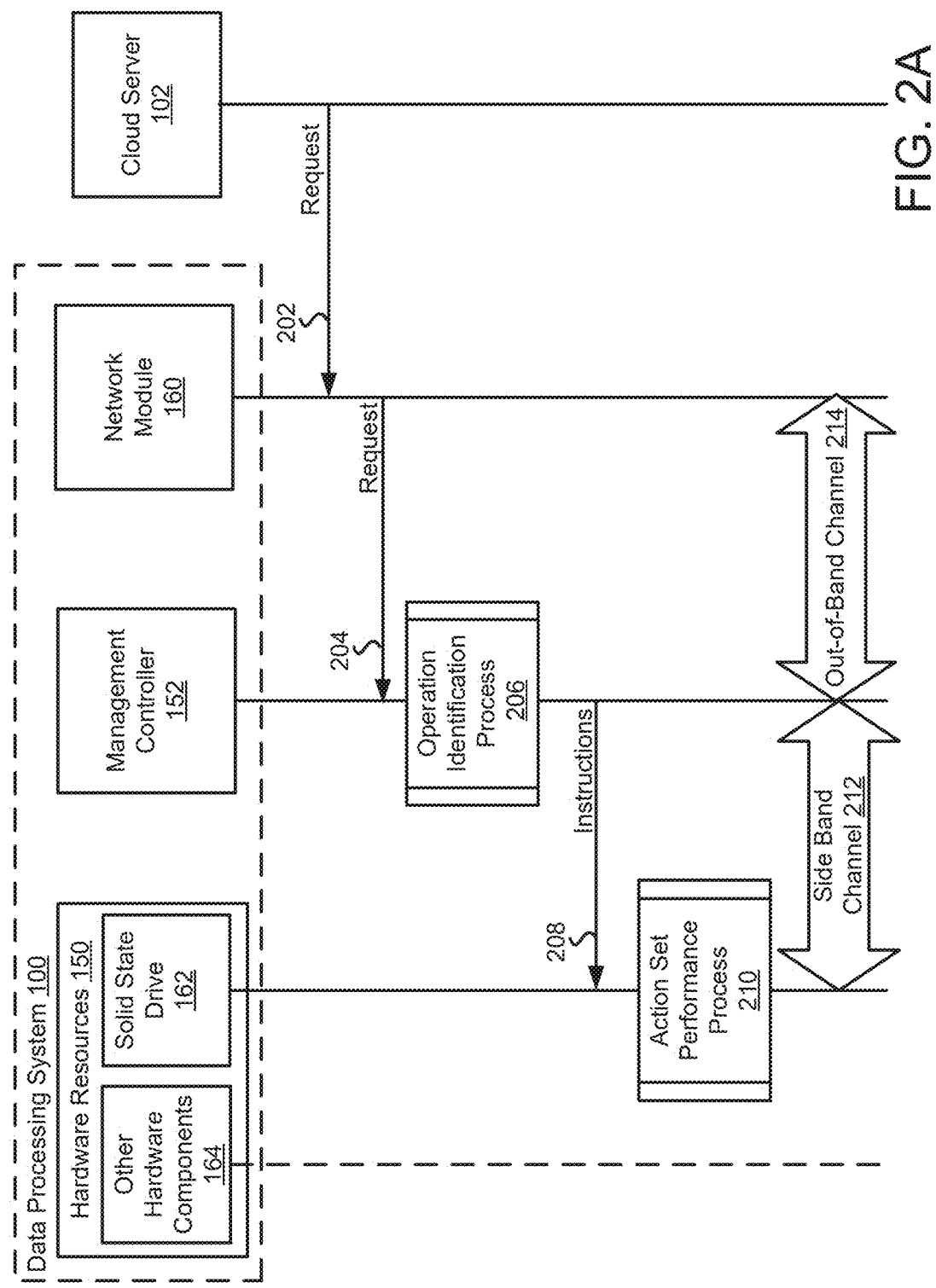
FIGS. 2A-2C show interaction diagrams in accordance with an embodiment.

To provide data management services, cloud server 102 may, for example, (i) provide requests (e.g., for managing data stored in a storage device of the data processing system) to the management controller (e.g., via out-of-band communication channels), (ii) participate in authentication processes (e.g., in order to verify authenticity of requesting entities), and/or (iii) perform other actions that may facilitate data management services to be provided by data processing system 100. Refer to FIG. 2A for additional information regarding managing requests to perform management operations for data stored by a storage device hosted by data processing systems in order to provide data management services.

Trusted sources 104 may also participate in the data management services. When participating in the data management services, trusted sources 104 may (i) provide request to manage data stored in a storage device of hardware resources of data processing system 100, (ii) provide user input regarding authorization to provide requests for data processing system 100, and/or (iii) perform other actions that may facilitate data management services to be provided by data processing system 100.

Thus, data stored by a storage device of data processing system 100 may be managed using out-of-band methods (e.g., using out-of-band components and via out-of-band communication channels). By doing so, management operations for data stored in the storage device may be implemented even in the event that the in-band components (e.g., hardware components and/or software resources) have limited functionality, thereby increasing the likelihood of providing the desired computer-implemented services.

Figure 3:
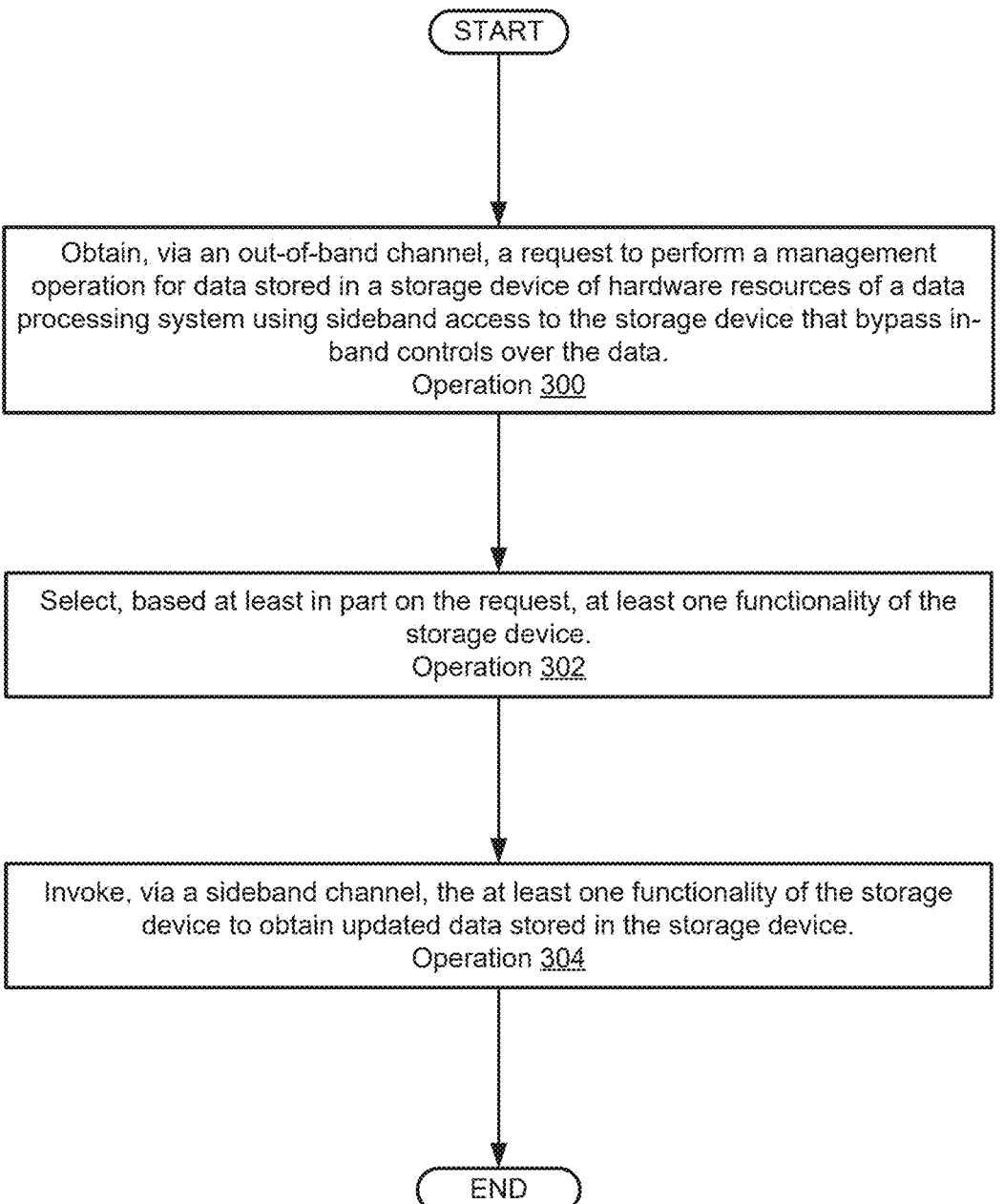
FIG. 3 shows a flow diagram illustrating a method of managing operation of a data processing system in accordance with an embodiment.

When providing their functionality, any of data processing system 100, cloud server 102, and/or trusted sources 104 may perform all, or a portion of the methods shown in FIG. 3.

Any of (and/or components thereof) data processing system 100, cloud server 102, and/or trusted sources 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 100, cloud server 102, and/or trusted sources 104 are implemented using an internet of things (IoT) device, which may include a computing device. The IoT device may operate in accordance with a communication model and/or management model known to data processing system 100, cloud server 102, trusted sources 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 106 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single cloud server (e.g., 102), it will be appreciated that the system may include any number of cloud servers.

Figure 1B:
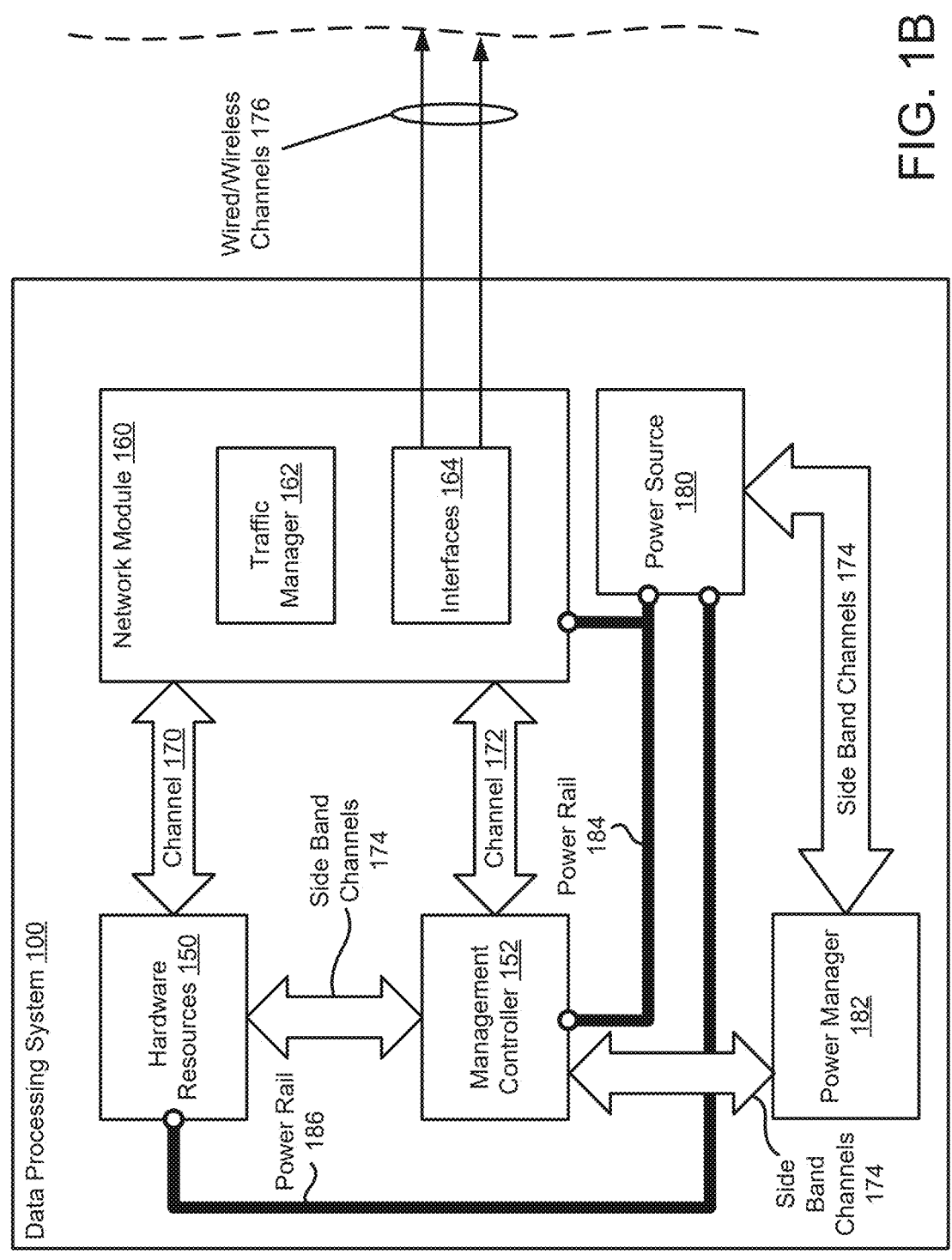
FIG. 1B shows a second block diagram illustrating a data processing system in accordance with an embodiment.

Turning to FIG. 1B, a diagram illustrating data processing system 100 in accordance with an embodiment is shown. Data processing system 100 may be similar to any of data processing systems 100 shown in FIG. 1A.

To provide computer-implemented services, data processing system 100 may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100) to another device via any number of intermediate networks (e.g., via wired/wireless channels 176 that are part of the networks).

In addition, different configurations of hardware resources 150 and/or software resources may be implemented by data processing system 100 based on the type of computer-implemented services that are to be provided. Modifications to configurations of hardware resources 150 and/or the software resources may lead to downtime for data processing system 100 and may consume network bandwidth of channel 170.

To reduce the likelihood of the applications and/or other in-band entities from being indirectly compromised, data processing system 100 may include management controller 152 and network module 160. Each of these components of data processing system 100 is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100 via separate channels (e.g., 172) from the in-band components.

Management controller 152 may be implemented, for example, using a system on a chip or other type of independently operating computing device (e.g., independent from the in-band components, such as hardware resources 150, of a host data processing system 100). Management controller 152 may provide various management functionalities for data processing system 100. For example, management controller 152 may monitor various ongoing processes performed by the in-band component, may manage power distribution, thermal management, and/or other functions of data processing system 100.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100.

To facilitate communication with other devices, data processing system 100 may include network module 160. Network module 160 may provide communication services for in-band components and out-of-band components (e.g., management controller 152) of data processing system.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100 may include network module 160. Network module 160 may provide communication services for in-band components and out-of-band components (e.g., management controller 152) of data processing system 100. To do so, network module 160 may include traffic manager 162 and interfaces 164.

Traffic manager 162 may include functionality to (i) discriminate traffic directed to various network endpoints advertised by data processing system 100, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100 may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations described in FIG. 2A.

While illustrated in FIG. 1B with a limited number of specific components, a system may include additional, fewer, and/or different components without departing from embodiments disclosed herein.

To further clarify embodiments disclosed herein, an interaction diagram in accordance with an embodiment is shown in FIG. 2A. The interaction diagram may illustrate examples of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 152, 160, 162, etc.), located towards the top of each figure. Lines descend from these shapes. Processes performed by the components of the system are illustrated using a second set of shapes (e.g., 206, 210, etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

The lines descending from the first set of shapes (e.g., other hardware components 164) are drawn in dashes to indicate, for example, that the corresponding components may not be (i) operable, (ii) powered on, (iii) present in the system, and/or (iv) not participating in operation of the system for other reasons.

The processes shown in FIG. 2A may be performed by any entity shown in the systems of FIGS. 1A-1B (e.g., a device similar to data processing system 100, a server similar to cloud server 102, a device similar to one of trusted sources 104, etc.) and/or another entity without departing from embodiments disclosed herein.

Turning to FIG. 2A, a first interaction diagram in accordance with an embodiment is shown. The interaction diagram may illustrate processes and interactions that may occur during performing management operations for data stored by a data processing system to obtain updated data.

To perform the management operations regardless of a status (e.g., powered, depowered, compromised, etc.) of hardware resources 150, management controller 152 may utilize out-of-band communication channel to interact (e.g., exchange data) with cloud server 102. Cloud server 102 may be responsible for providing requests to management controller 152 regarding performance of management operations for the data stored by data processing system 100 (e.g., in a storage device hosted by the data processing system).

To initiate performance of the management operations, at operation 202, a request may be provided to network module 160 by cloud server 102. For example, the request may be generated and provided to network module 160 via (i) transmission via a message, (ii) storing in a storage with subsequent retrieval by network module 160, (iii) via a publish-subscribe system where network module 160 subscribes to updates from cloud server 102 thereby causing a copy of the request to be propagated to network module 160, and/or via other processes. By providing the request to network module 160, network module 160 may receive a copy of the request for data processing system 100.

The request may include: (i) a payload including a message specifying a management operation (e.g., type of operation) for data stored by data processing system 100, (ii) an identity of the requesting entity (e.g., providing the request), (iii) a signature of the requesting entity, and/or (iv) any other information necessary to perform management operation for data stored by data processing system 100.

At interaction 204, the request may be provided to management controller 152 by network module 160. For example, the request may be provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the request to be propagated to management controller 152, and/or via other processes. The request may be provided to management controller 152 via an out-of-band communication channel similar to channel 172 described in FIG. 1B. By providing the request to management controller 152, management controller 152 may receive a copy of the request for data processing system 100 in order to perform management operation services for data stored by data processing system 100.

To provide management operation services, management controller may perform operation identification process 206. During operation identified process 206, management controller 152 may identify a management operation for data stored by a storage device (e.g., solid state drive 162) of data processing system 100 to be performed and enable functionality of the storage device to perform the management operation. For example, management controller 152 may (i) identify location of the data being stored in solid-state drive 162 hosted by hardware resources 150, (ii) identify the management operation to be performed, (iii) select at least one functionality of solid-state drive 162 based on the request, (iv) invoke, using at least a sideband channel between management controller 152 and solid state drive 162, the selected functionality, and/or (v) perform other methods.

Identifying the management operation to be performed may include reading (e.g., via a payload) the request to identify one operation selected (e.g., by a user or administrator of the data processing system). The management operations for data stored by the storage device of data processing system may include: (i) deletion of the data, (ii) encryption of the data, (iii) verification of integrity and/or trust in the data, (iv) decryption of the data, and/or (v) any other operations to manage the data.

Selecting the at least one functionality of the storage device (e.g., solid state drive 162) may include, for example, utilizing the information included in the request to determine what type of function (e.g., reading, writing, and/or deletion of data) of the storage device corresponds to the identified management operation.

Invoking the selected functionality may include various action sets to be performed by management controller 152 corresponding to the selected functionality. For example, management controller may generate instructions related to the identified management operation and encapsulate the instructions into a data structure readable by the storage device (e.g., solid state drive 162).

At interaction 208, the instructions may be provided to solid state drive 162 by management controller 152. For example, the instructions may be generated by management controller 152 and may be provided to solid state drive 162 via side band channel 212 through (i) transmission via a message, (ii) storing in a storage with subsequent retrieval by solid state drive 162, (iii) via a publish-subscribe system where solid state driver 162 subscribes to updates from management controller 152 thereby causing a copy of the instructions to be propagated to solid state drive 162, and/or via other processes.

Once received, solid state drive 162 may use the instructions to perform action set performance process 210 to update the data stored in solid state drive 162. During action set performance process 210, solid state drive 162 may perform the selected functionality (e.g., read, write, and/or delete) for the data stored therein. For example, solid state drive 162 may read the data structure (e.g., stored by the management controller 152) including instructions to delete the data stored therein and may perform the function of deleting the data accordingly.

Thus, as shown in the example of FIG. 2A, operations of a data processing system, for example, data stored in a storage device of the data processing system may be managed using out-of-band methods and sideband access to the storage device (e.g., by out-of-band component) to bypass in-band controls over the data. For example, requests to perform a management operation for data stored in a solid-state drive (e.g., storage device hosted by the hardware resources of the data processing system) may be verified, processed, and/or managed using out-of-band components (e.g., management controller and using out-of-band communication channels) and sideband communication channel to the solid-state drive in order to implement the requested management operation (e.g., control over the data stored in the solid-state driver). By using out-of-band components, functionality of the storage device may be invoked to manage the data even in the event in-band components (e.g., hardware resources 150) are not operational, compromised, and/or not functional (e.g., powered off, lack a network connection, etc.).

Figure 2B:
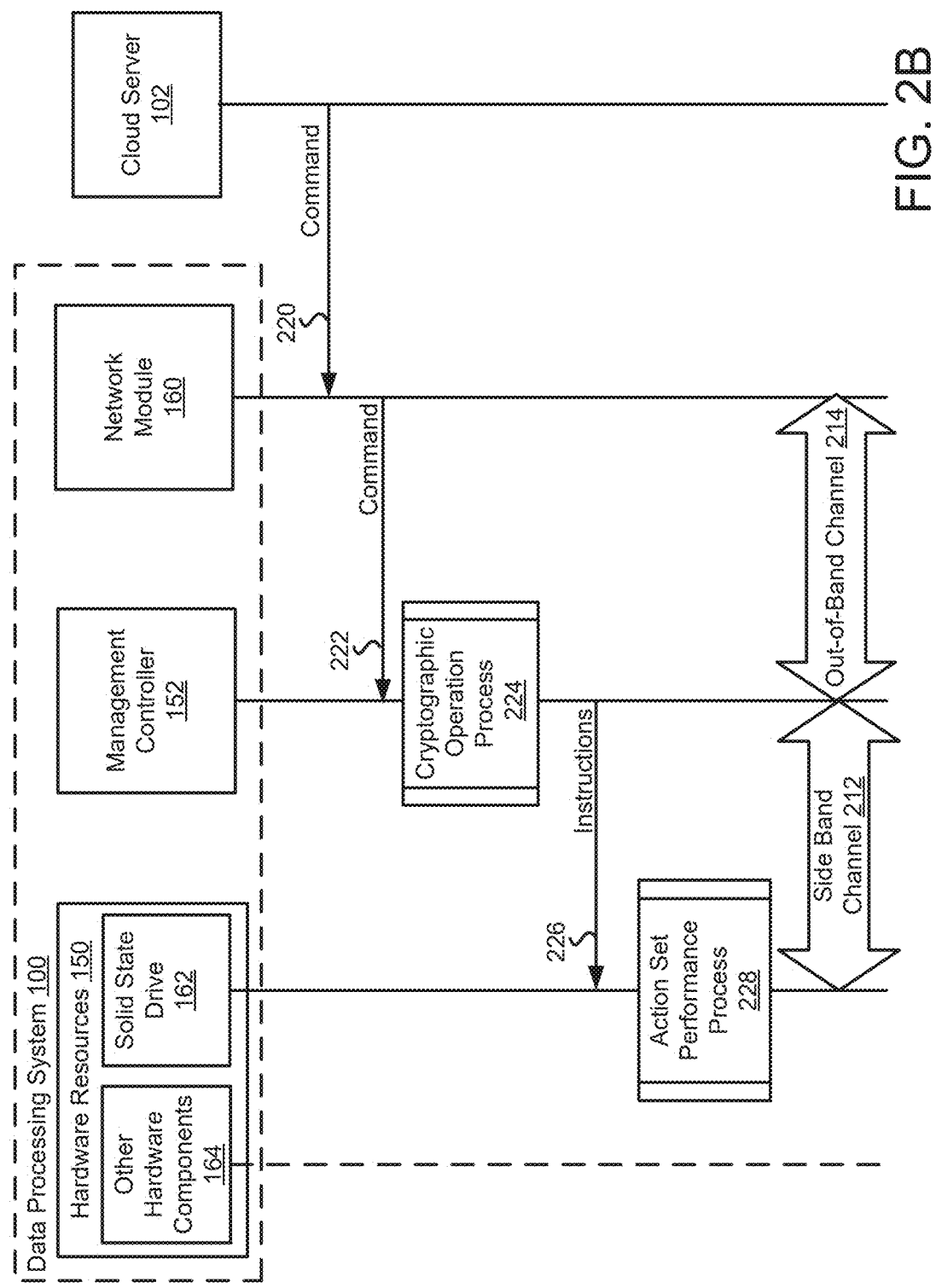

Turning to FIG. 2B, a second interaction diagram in accordance with an embodiment is shown. The interaction diagram may illustrate processes and interactions that may occur during performance of cryptographic operations to manage data stored by a data processing system using out-of-band methods.

To perform cryptographic operations, at interaction 220, a command may be provided to network module 160 by cloud server 102. For example, the command may be generated and provided to network module 160 via (i) transmission via a message, (ii) storing in a storage with subsequent retrieval by network module 160, (iii) via a publish-subscribe system where network module 160 subscribes to updates from cloud server 102 thereby causing a copy of the command to be propagated to network module 160, and/or via other processes. By providing the command to network module 160, network module 160 may receive a copy of the command for data processing system 100.

The command may include: (i) a payload including a message specifying a management operation (e.g., type of operation) for data stored by data processing system 100, (ii) information usable to establish access control for operation of and/or data stored by data processing system 100, (iii) an identity of the requesting entity (e.g., unique identifiers for the device and/or entity providing the request), (iv) a signature of the requesting entity, and/or (v) any other information necessary to perform cryptographic operations to manage the data stored by data processing system 100.

For example, the command may include an encryption key (e.g., generated by cloud server 102) usable to encrypt data, such as NVMe boot data in order to prevent or limit access to data used for performing start-up operations of the data processing system in the event the data processing system may be potentially compromised (e.g., physically and/or via malware installed by a malicious entity).

As a secondary example, the command may include a decryption key (e.g., generated by cloud server 102) usable to decrypt data (e.g., that may be previously encrypted using an encryption key generated by the cloud server), such as the NVMe boot data in order to allow or enable access to the data used to perform start-up operations of the data processing system in the event the data processing system has been securely recovered by an authorized user and/or the potential security threat is alleviated.

Additionally, the command may include instructions to selectively encrypt data based on a policy that keys encryption states of the data to a current geographic location of data processing system 100. For example, based on pre-determined geolocation policies (e.g., established by a user and/or administrator of the data processing system), the data stored by a solid-state drive (e.g., 162) of data processing system 100 may be encrypted when the data processing system is located in a geographic area (e.g., corresponding to a potential security threat impacting the data processing system) and the data may remain encrypted until a new location of data processing system 100 is identified and the new location is a geolocation area that allows access to the data (e.g., due to decreased likelihood of a potential security threat impacting the data processing system).

At interaction 222, a command may be provided to management controller 152 by network module 160. For example, the command may be provided to management controller 152 via (i) transmission via a message, (ii) storing in a storage with subsequent retrieval by network module 160, (iii) via a publish-subscribe system where management controller 152 subscribes to updates from network module 160 thereby causing a copy of the command to be propagated to management controller 152, and/or via other processes. By providing the command to management controller 152, management controller 152 may receive a copy of the command for data processing system 100.

In response to receiving the command, management controller 152 may perform cryptographic operation process 224 to securely manage the data stored by hardware resources 150 (e.g., specifically solid-state drive 162) using cryptographic information. During cryptographic operation process 224, management controller 152 may: (i) read the requested management operation to perform from the command, (ii) select at least one functionality of the storage device (e.g., solid-state drive 162) based at least in part on the requested management operation, (iii) invoking, using at least a sideband communication channel, the selected functionality, and/or (iv) perform other actions to perform the cryptographic operation for the data stored by data processing system 100.

For example, management controller 152 may obtain an encryption key from a payload of the command, identify an encryption operation for data stored by solid-state drive 162, generate instructions to invoke the functionality of the solid-state drive (e.g., in a format as prescribed and understood by the storage device) to encrypt the data using the encryption key.

At interaction 226, the instructions may be provided to solid-state drive 162 by management controller 152 via sideband access (e.g., side band channel described in FIG. 1B). The sideband access may be facilitated using a shared communication bus between the out-of-band component (e.g., management controller 152) and the storage device (e.g., solid-state drive 162).

For example, at interaction 226, the instructions may be generated and provided to solid state driver 162 via side band channel 212 through (i) transmission via a message, (ii) storing in a storage with subsequent retrieval by management controller 152, (iii) via a publish-subscribe system where solid state driver 162 subscribes to updates from management controller 152 thereby causing a copy of the instructions to be propagated to solid state drive 162, and/or via other processes.

The instructions may include instructions to perform cryptographic operations (e.g., encryption or decryption processes using an encryption key or decryption key, respectively) on data stored in solid state drive 162 for data processing system 100. Additionally, the instructions (e.g., including cryptographic information such as encryption and/ or decryption keys) may be encapsulated into a data structure (e.g., in a format readable by solid-state drive 162).

Once obtained, the instructions may be used by solid state driver 162 to perform action set performance process 228. During action set performance process 228, solid-state drive 162 may read the instructions and perform the requested cryptographic operation to update the data stored in solid-state drive 162. For example, an encryption key may be read that may be used to encrypt NVMe boot data stored in solid-state drive 162 in order to restrict start-up operations of data processing system 100.

In the above-mentioned example regarding decryption operations, a decryption key may be read that may be used to decrypt the NVMe boot data stored in solid-state drive 162 in order to enable start-up operations of data processing system 100.

Thus, as shown in the example of FIG. 2B, cryptographic operations to manage data stored in a storage device of data processing system may be managed using out-of-band methods and sideband access to the storage device to bypass in-band components to control the data. By doing so, functionality of the storage device may be invoked to encrypt and/or decrypt the data even in the event in-band components (e.g., hardware resources 150) are not operational, compromised, and/or not functional (e.g., powered off, lack a network connection, etc.) and thereby providing a less destructive form of restricting use of data stored by the data processing system and/or preventing unauthorized operation of the data processing system.

Figure 2C:
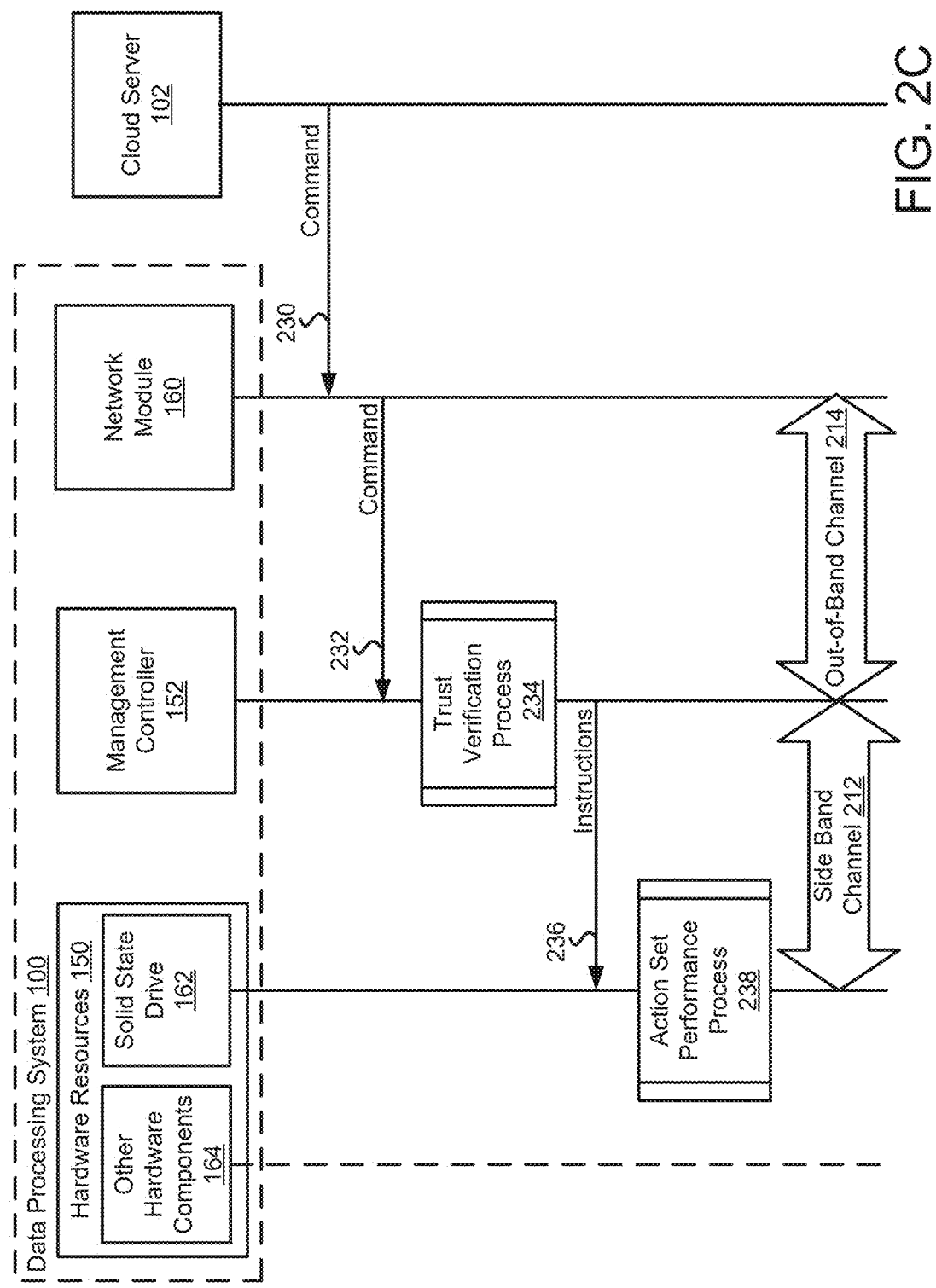

Turning to FIG. 2C, a third interaction diagram in accordance with an embodiment is shown. The interaction diagram may illustrate processes and interactions that may occur during validation of trustworthiness of data stored by a data processing system.

To validate the trustworthiness of the data, at interaction 230, a command may be generated and provided to network module 160 by cloud server 102. For example, the command may be generated and provided to network module 160 via (i) transmission via a message, (ii) storing in a storage with subsequent retrieval by network module 160, (iii) via a publish-subscribe system where network module 160 subscribes to updates from cloud server 102 thereby causing a copy of the command to be propagated to network module 160, and/or via other processes. By providing the command to network module 160, network module 160 may receive a copy of the command for data processing system 100.

The command may include: (i) a payload including a message specifying a management operation (e.g., type of operation) for data stored by data processing system 100, (ii) information usable to establish access control for operation of and/or data stored by data processing system 100, (iii) an identity of the requesting entity (e.g., unique identifiers for the device and/or entity providing the request), (iv) a signature of the requesting entity, and/or (v) any other information necessary to perform validation processes to manage the data stored by data processing system 100.

For example, the command may include a signature of a known good copy of the data (e.g., a hash of the known good copy of the data) usable to perform a verification process to determine whether the data stored in solid state drive 162 is trustworthy (e.g., in good operating condition).

At interaction 232, the command may be provided to management controller 152 by network module 160. For example, the command may be provided to management controller 152 via out-of-band channel 214 through (i) transmission via a message, (ii) storing in a storage with subsequent retrieval by management controller 152, (iii) via a publish-subscribe system where management controller 152 subscribes to updates from network module 160 thereby causing a copy of the command to be propagated to management controller 152, and/or via other processes. By providing the command to management controller 152, management controller 152 may receive a copy of the command for data processing system 100.

In response to receiving the command, management controller 152 may perform trust verification process 234 to verify the trustworthiness of the data stored by hardware resources 150 (e.g., specifically solid state drive 162). During trust verification process 234, management controller 152 may: (i) read the requested management operation to perform from the command, (ii) select at least one functionality of the storage device (e.g., solid-state drive 162) based at least in part on the requested management operation, (iii) invoking, using at least a sideband communication channel, the selected functionality, and/or (iv) perform other actions to verify the trustworthiness of the data stored in a storage device hosted by data processing system 100.

For example, management controller 152 may obtain a hash of a known good copy of the data (e.g., via reading the command) and generate instructions specifying a comparison process between the hash of the known good copy of the data and the generated hash of the copy of data stored in the storage device (e.g., solid state drive 162).

At interaction 236, the instructions may be provided to solid-state drive 162 by management controller 152 via sideband access (e.g., side band channel described in FIG. 1B). The sideband access may be facilitated using a shared communication bus between the out-of-band component (e.g., management controller 152) and the storage device (e.g., solid-state drive 162).

For example, at interaction 236, the instructions may be generated and provided to solid state driver 162 via side band channel 212 through (i) transmission via a message, (ii) storing in a storage with subsequent retrieval by management controller 152, (iii) via a publish-subscribe system where solid state driver 162 subscribes to updates from management controller 152 thereby causing a copy of the instructions to be propagated to solid state drive 162, and/or via other processes.

The instructions may include instructions to perform any type of comparison process between a hash of the data stored in solid state drive 162 and a signature of a known good copy of the data (e.g., obtained via the command) to identify whether the data has been modified (e.g., inadvertently or advertently) and provide an action set to be performed based on the determination of the comparison process (e.g., if verification of the data is approved or not).

Once obtained, the instructions may be used by solid state driver 162 to perform action set performance process 238. During action set performance process 238, solid-state drive 162 may read the instructions and perform the requested comparison process to verify if the data stored in solid-state drive is trustworthy. If the data is determined to be trustworthy (e.g., the hash of the stored data matches the hash of the known good copy of the data), the data stored in solid state drive 162 may be confirmed to be trustworthy by providing a notification to management controller 152 via side band channel 212.

Conversely, if the data is determined to be untrustworthy (e.g., the hash of the stored data does not match the hash of the known good copy of the data), solid state drive 162 may obtain a new copy of the data (e.g., from management controller 152) and replace the untrustworthy copy of data with the new copy of the data to remediate the operational condition of data processing system 100. For example, if a corrupt driver is identified, a new copy of program code may be obtained (e.g., via downloading from a trusted source) and used to overwrite the old program code (e.g., corrupt or untrustworthy copy of the data) stored in solid state drive 162.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to generate auditory signals by data processing systems using out-of-band methods. By using out-of-band methods (e.g., out-of-band components and/or out-of-band communication channels) to obtain and manage requests for performance of sounds to alert users of data processing systems, the data processing systems may be more likely to provide secure and reliable computer-implemented services.

FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources, a network module), a server, a user device, and/or another device.

Turning to FIG. 3, a flow diagram illustrating a method of managing operation of a data processing system in accordance with an embodiment is shown. The method may be performed, for example, by a data processing system, a management system, a communication system, a management controller, hardware resources, and/or other components illustrated in FIGS. 1A-2C.

At operation 300, a request may be obtained. The request may include performance of a management operation for data stored in a storage device of hardware resources of a data processing system using sideband access to the storage device that bypasses in-band controls over the data. The request may be obtained via an out-of-band channel using methods described with respect to FIGS. 1A-2C and/or by other out-of-band communication methods. For example, to avoid using any potentially unavailable hardware resources (e.g., in-band components) of the data processing system, the request may be obtained by a management controller of the data processing system and/or may be provided (e.g., transmitted) to the network module via the out-of-band channel. The request may be obtained by: (i) receiving the request from an external entity, (ii) reading the request from storage, and/or (iii) other methods.

Obtaining the request may include: receiving communications from a cloud server in which the request is conveyed to the management controller. The request may be initiated by a trusted source distinct from the cloud server.

At operation 302, at least one functionality of the storage device may be selected based at least in part on the request. The at least one functionality of the storage device may be selected by (i) identifying the functionality of the storage device based on the identified management operation, (ii) reading the at least one functionality from the request, and/or (iii) other methods.

At operation 304, the at least one functionality of the storage device may be invoked to obtain updated data stored in the storage device. As a first example of invoking the at least one functionality may include: obtaining an encryption key from a payload of the request and using the encryption key to encrypt the data stored in the storage device, wherein the encryption key is generated by the cloud server and permanently deleted from the data processing system after the data is encrypted.

As a secondary example of invoking the at least one functionality may include: initiating generation of a second hash for the data and comparison of the second hash to a signature of a known good copy of the data. The signature may include a hash of the known good copy of the data. For example, a management controller may generate the second hash for the data by reading the data from storage (e.g., storage device of the data processing system), obtaining a copy of the second hash for the data, and/or by performing other methods.

The method may end following operation 304.

Using the methods illustrated in FIG. 3, embodiments disclosed herein may provide systems and methods usable to perform management operations for data stored by a storage device hosted by data processing systems by utilizing out-of-band components. By managing the audio requests without relying on in-band communication methods, the likelihood of performing requests to perform management operations for data stored by the data processing system may be increased. By performing management operations for data stored by the data processing systems, computer-implemented services provided by the data processing systems may be more likely to be desirable.

Figure 4:
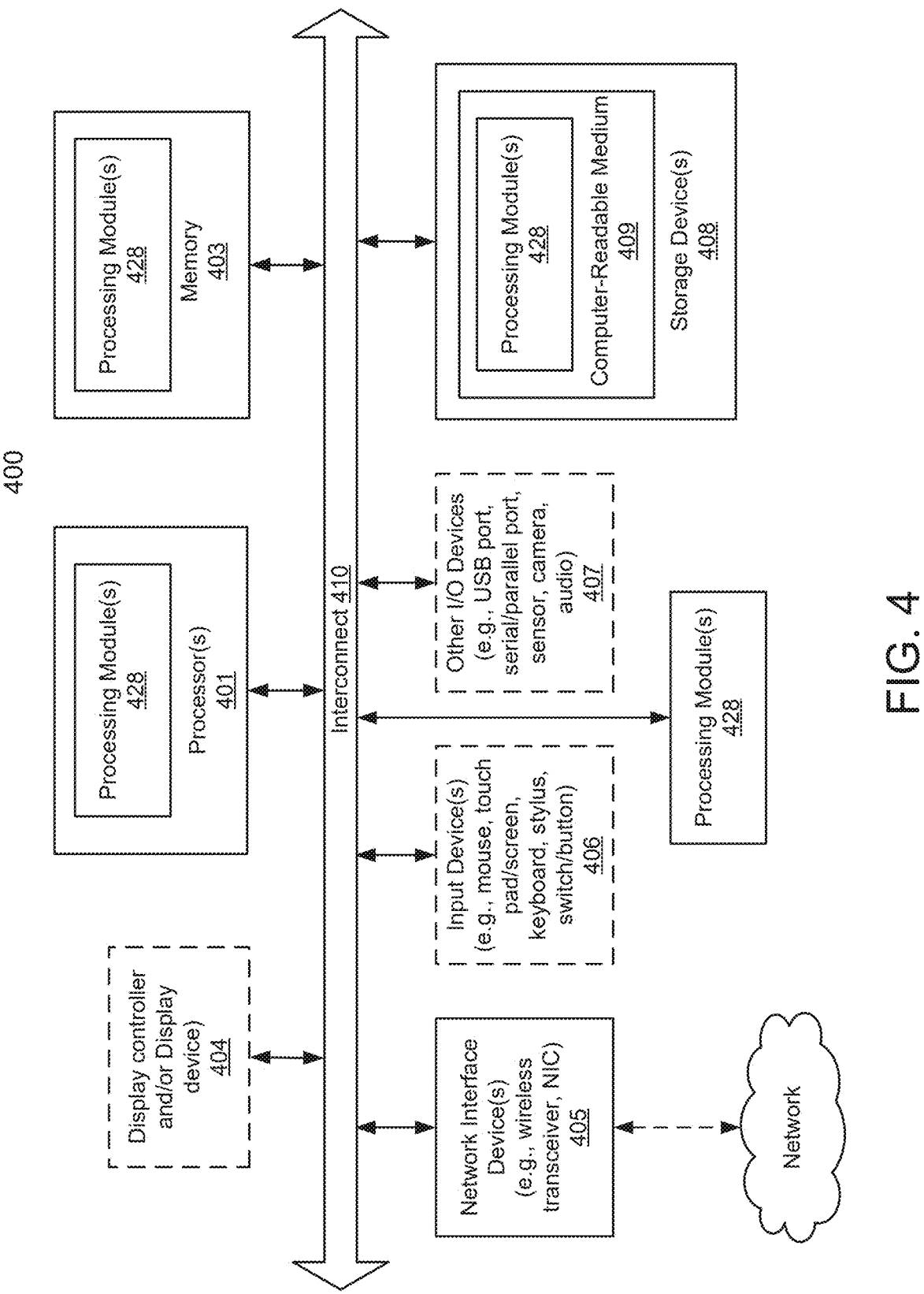
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining, by a management controller of the data processing system and via an out-of-band communication channel, a request to perform a management operation for data stored in a storage device of hardware resources of the data processing system using sideband access to the storage device that bypasses in band controls over the data, wherein the request comprises an identity of a requesting entity and a signature of the requesting entity;

selecting, by the management controller and based at least in part on the request, at least one functionality of the storage device;

invoking, by the management controller and via a sideband channel, the at least one functionality of the storage device to obtain updated data stored in the storage device;

advertising a first network endpoint for the management controller using the out-of-band communication channel; and advertising a second network endpoint for the hardware resources using an in-band communication channel, wherein the out-of-band communication channel utilizes a first network stack that is independent to and distinct from a second network stack utilized by the in-band communication channel, and wherein the management controller is physically separate from the hardware resources.

2. The method of claim 1, wherein obtaining the request comprises:

receiving communications from a cloud server in which the request is conveyed to the management controller, wherein the request is initiated by a trusted source distinct from the cloud server.

3. The method of claim 1, wherein the management operation is one operation selected from a list of operations consisting of:

deletion of the data;

encryption of the data;

verification of integrity and/or trust in the data; and decryption of the data.

4. The method of claim 2, wherein encryption of the data uses an encryption key specified by the cloud server.

5. The method of claim 3, wherein encryption of the data is based on a policy that associates encryption states of the data with a current geographic location of an endpoint device advertised by the data processing system.

6. The method of claim 1, wherein the sideband access is facilitated using a shared communication bus between the management controller and the storage device.

7. The method of claim 6, wherein the storage device is a solid state storage device.

8. The method of claim 7, wherein the solid state storage device is compliant with a mechanical form factor associated with a Non-Volatile Memory Express (NVMe) protocol.

9. The method of claim 2, wherein the invoking the at least one functionality comprises:

obtaining, by the management controller, an encryption key from a payload of the request; and using the encryption key to encrypt the data stored in the storage device, wherein the encryption key is generated by the cloud server and permanently deleted from the data processing system after the data is encrypted.

10. The method of claim 1, wherein invoking the at least one functionality comprises:

initiating generation of a second hash for the data and comparison of the second hash to a signature of a known good copy of the data, wherein the signature comprises a hash of the known good copy of the data.

11. The method of claim 1, wherein the management controller is configured to manage at least one of power distribution or thermal management of the data processing system.

12. The method of claim 1, wherein the management controller is on a separate power domain from the hardware resources so that the management controller is operable while the hardware resources are inoperable.

13. The method of claim 1, wherein the out-of-band communication channel runs through a network module, and an in-band communication channel that services the hardware resources also runs through the network module.

14. The method of claim 13, wherein the network module hosts a transmission control protocol/internet protocol (TCP/IP) stack to facilitate network communications via the out-of-band communication channel.

15. A non-transitory machine-readable medium having instructions stored therein, which when executed by a processor, cause the processor to perform operations for managing operation of a data processing system, the operations comprising:

obtaining, by a management controller of the data processing system and via an out-of-band communication channel, a request to perform a management operation for data stored in a storage device of hardware resources of the data processing system using sideband access to the storage device that bypasses in band controls over the data, wherein the request comprises an identity of a requesting entity and a signature of the requesting entity;

selecting, by the management controller and based at least in part on the request, at least one functionality of the storage device;

invoking, by the management controller and via a sideband channel, the at least one functionality of the storage device to obtain updated data stored in the storage device;

advertising a first network endpoint for the management controller using the out-of-band communication channel; and advertising a second network endpoint for the hardware resources using an in-band communication channel, wherein the out-of-band communication channel utilizes a first network stack that is independent to and distinct from a second network stack utilized by the in-band communication channel, and wherein the management controller is physically separate from the hardware resources.

16. The non-transitory machine-readable medium of claim 15, wherein obtaining the request comprises:

receiving communications from a cloud server in which the request is conveyed to the management controller, wherein the request is initiated by a trusted source distinct from the cloud server.

17. The non-transitory machine-readable medium of claim 15, wherein the management operation is one operation selected from a list of operations consisting of:

deletion of the data;

encryption of the data;

verification of integrity and/or trust in the data; and decryption of the data.

18. A data processing system, comprising:

a processor; and a memory coupled to the processor to store instructions, which when executed by the processor, cause the processor to perform operations for managing operation of a data processing system, the operations comprising:

obtaining, by a management controller of the data processing system and via an out-of-band communication channel, a request to perform a management operation for data stored in a storage device of hardware resources of the data processing system using sideband access to the storage device that bypasses in band controls over the data, wherein the request comprises an identity of a requesting entity and a signature of the requesting entity;

selecting, by the management controller and based at least in part on the request, at least one functionality of the storage device;

invoking, by the management controller and via a sideband channel, the at least one functionality of the storage device to obtain updated data stored in the storage device, advertising a first network endpoint for the management controller using the out-of-band communication channel; and advertising a second network endpoint for the hardware resources using an in-band communication channel, wherein the out-of-band communication channel utilizes a first network stack that is independent to and distinct from a second network stack utilized by the in-band communication channel, and wherein the management controller is physically separate from the hardware resources.

19. The data processing system of claim 18, wherein obtaining the request comprises:

receiving communications from a cloud server in which the request is conveyed to the management controller, wherein the request is initiated by a trusted source distinct from the cloud server.

20. The data processing system of claim 18, wherein the management operation is one operation selected from a list of operations consisting of:

deletion of the data;

encryption of the data;

verification of integrity and/or trust in the data; and decryption of the data.

* * * * *